(12) United States Patent
Ludwig et al.

(10) Patent No.: US 6,945,355 B2
(45) Date of Patent: Sep. 20, 2005

(54) MUFFLER ARRANGEMENT FOR A FLOW DUCT

(75) Inventors: Ludwin Ludwig, Hallerndorf (DE); Guenther Schulze, Seukendorf (DE); Wolfgang Schuez, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/448,074

(22) Filed: May 30, 2003

(65) Prior Publication Data

US 2003/0221904 A1 Dec. 4, 2003

(30) Foreign Application Priority Data

May 31, 2002 (EP) .............................................. 02012115

(51) Int. Cl.[7] .............................. E04F 17/04; F01N 1/08; F01N 1/10; F24F 7/04; F24F 13/24
(52) U.S. Cl. ........................ 181/224; 181/270; 454/262; 454/906; 454/206; 454/346
(58) Field of Search ................................. 181/224, 264, 181/270, 281, 258, 222, 252, 256; 454/206, 262, 264, 265, 267, 268, 346–348, 351, 352, 358, 906

(56) References Cited

U.S. PATENT DOCUMENTS

| | | | |
|---|---|---|---|
| 2,916,101 A | | 12/1959 | Naman .......................... 181/42 |
| 2,925,830 A | * | 2/1960 | Kautrowitz .................. 181/264 |
| 3,195,679 A | * | 7/1965 | Duda et al. ................... 181/222 |
| 3,378,100 A | * | 4/1968 | Welty ........................... 181/224 |
| 3,895,686 A | | 7/1975 | Savkar et al. .................. 181/56 |
| 4,263,982 A | * | 4/1981 | Feuling ......................... 181/256 |
| 4,266,602 A | * | 5/1981 | White et al. ................. 181/224 |
| 4,316,522 A | * | 2/1982 | Hirschorn ..................... 181/224 |
| 5,332,872 A | * | 7/1994 | Ewanek ...................... 181/224 |

FOREIGN PATENT DOCUMENTS

| | | | | |
|---|---|---|---|---|
| DE | 12 42 383 B | | 7/1967 | |
| DE | 3544022 A1 | * | 6/1987 | .......... G10K/11/16 |
| FR | 1 313 643 A | | 12/1962 | |
| FR | 2624641 A1 | * | 6/1989 | ............ E06B/7/02 |
| GB | 663 241 A | | 3/1949 | |
| JP | 62017548 A | * | 1/1987 | ............. F24F/7/04 |
| JP | 62017563 A | * | 1/1987 | ............ F24F/13/06 |
| JP | 02298619 A | * | 12/1990 | ............ F01N/1/24 |

* cited by examiner

Primary Examiner—Edgardo San Martin
(74) Attorney, Agent, or Firm—Harness, Dickey & Pierce, P.L.C.

(57) ABSTRACT

A muffler arrangement includes muffler elements arranged in rows which are oriented in each case transversely to a direction of flow. The muffler elements themselves are oriented in each case longitudinally in relation to the direction of flow. The distance between two adjacent muffler rows in this case amounts to approximately at least four times, or at least six times, the distance between two adjacent muffler elements of the equidistantly arranged muffler elements of a muffler row and/or the flow off edges of the muffler elements of at least one muffler row have guide plates. Equipping of the muffler elements of the last muffler row in the direction of flow may be dispensed with.

12 Claims, 3 Drawing Sheets

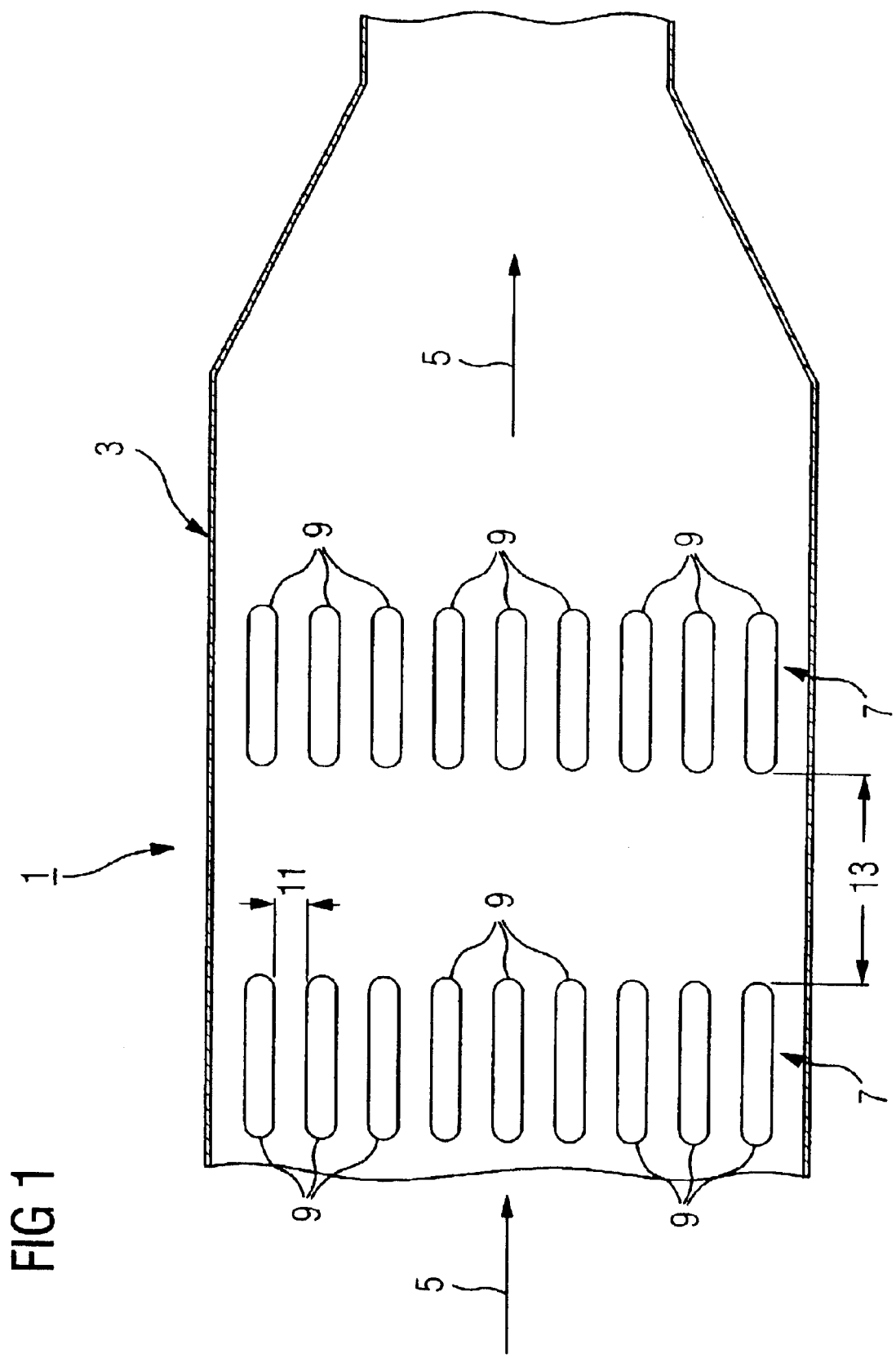

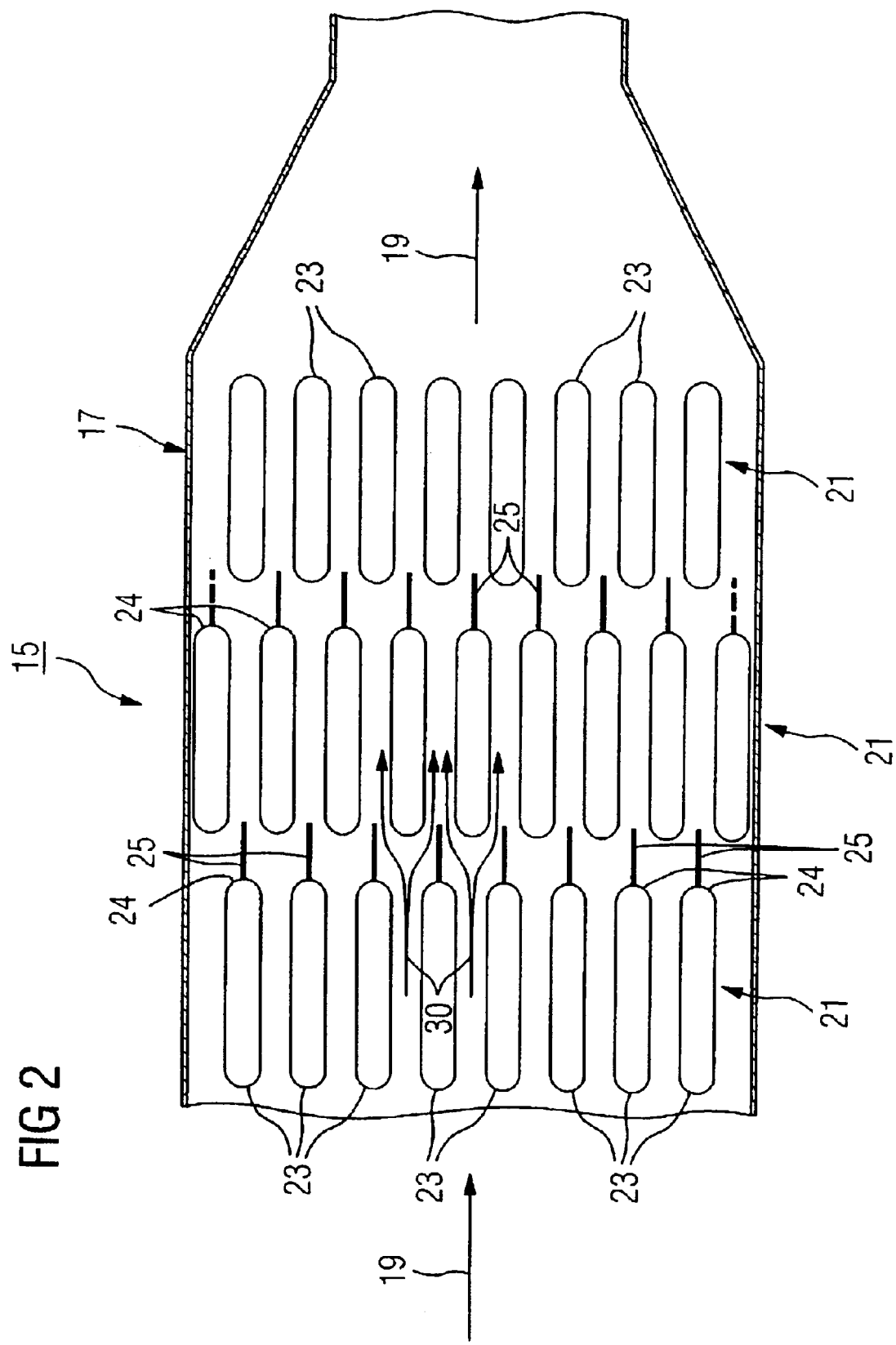

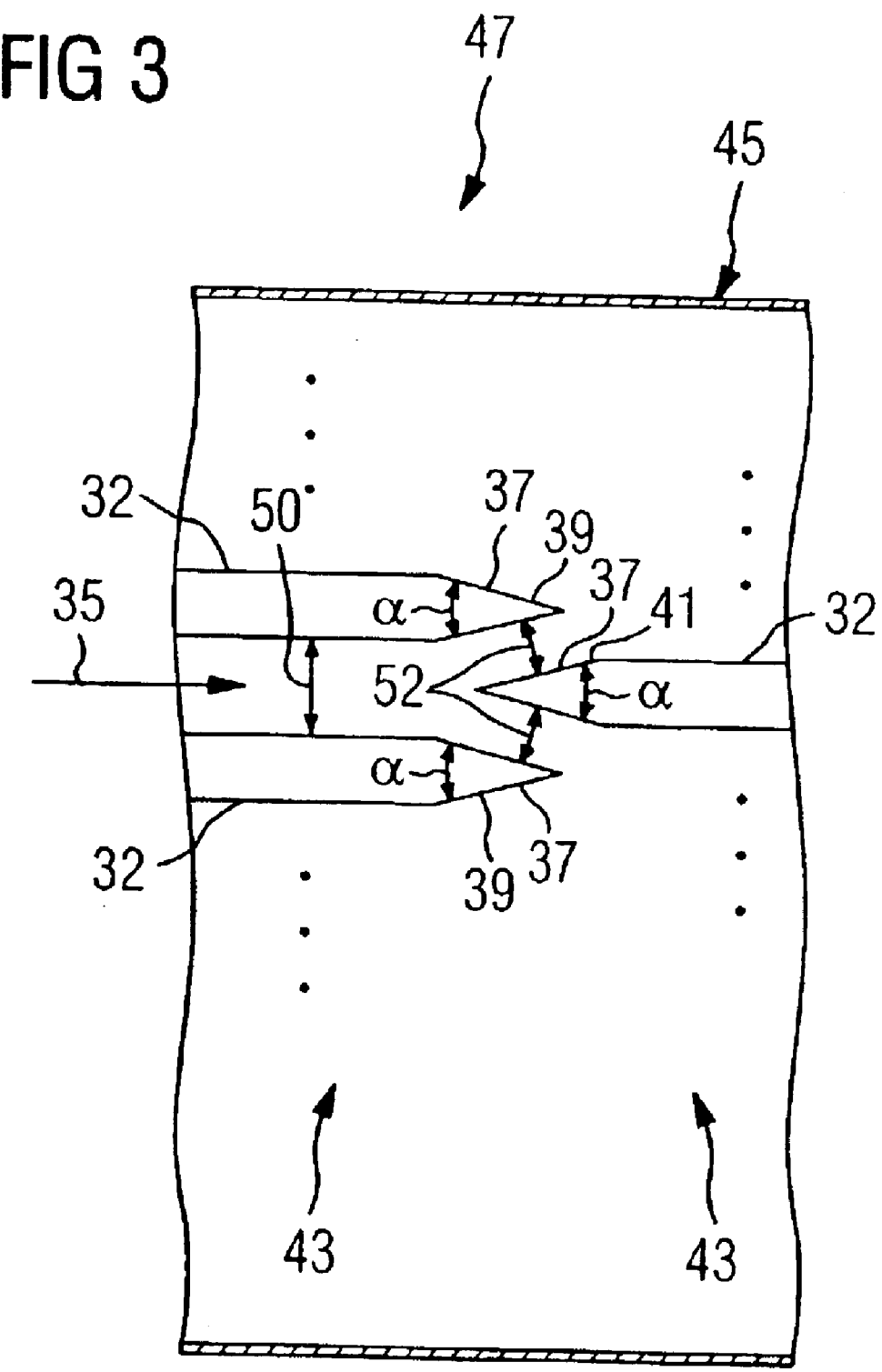

MUFFLER ARRANGEMENT FOR A FLOW DUCT

The present application hereby claims priority under 35 U.S.C. §119 on German patent application number EP 02012115.8 filed May 31, 2002, the entire contents of which are hereby incorporated herein by reference.

FIELD OF THE INVENTION

The present invention generally relates to a muffler arrangement for a flow duct, in particular, for an intake housing of a gas turbine.

BACKGROUND OF THE INVENTION

A muffler arrangement having a flow duct is intended to eliminate or at least mitigate the disturbing generation of noise and stimulation of vibrations which are caused by a flow, for example an air and/or gas flow, in a flow duct.

Disturbing vibrations, for example of the intake housing and of the muffler arrangement, are to be largely avoided.

Disturbing vibrations are generated particularly when an undesirable swirling of the flow medium occurs in the flow. Particularly when the flow duct is operated with different operating pressures and/or operating velocities of the flow medium, for example the intake housing of a gas turbine, where the pressure and/or the velocity of the intake air fluctuates sharply, depending on the required power output, measures for the avoidance of, in particular, self-excited vibrations are difficult, since these should take into account every operating situation.

Known muffling measures include, for example, the arrangement of a number of muffler elements in the flow duct, for example plates, as a result of which essentially the flow is to be led along a desired path through the flow duct, in order to alleviate undesirable swirlings and the vibration problems associated with these.

However, when the operating conditions, such as, for example, the pressure and/or the flow velocity of the flow medium, vary while the flow duct is in operation, it often happens that the flow which is established deviates seriously from the desired path, for example as a result of a minor disturbance. Due to the undesirable and usually asymmetric pressure conditions which are then established, even the muffler elements themselves are often excited to vibrate.

Examples of known arrangements of this type, which present problems in terms of an undesirable excitation to vibration of the muffler elements, are arrangements of a plurality of rows of muffler elements, arranged one behind the other in the direction of flow, transversely to the direction of flow, the muffler elements themselves being arranged longitudinally in relation to the direction of flow.

The next row following a preceding row can then be arranged so as to be offset transversely ("staggered") or not offset transversely ("in line") with respect to the preceding row.

In the first case, the flow, for example an airflow which is led between two muffler elements of the preceding row, is apportioned, in particular symmetrically, to the two flow corridors formed by the adjacent three muffler elements of the next row, in the case of low flow velocities.

Beyond a specific flow velocity, beyond a specific power stage with regard to a gas turbine, the disturbances in the flow are such that the airflow is apportioned randomly and unevenly, so that, in an extreme situation, only one of the abovementioned two flow corridors of the next row leads the airstream further on, and the airstream may oscillate between the two flow corridors.

The asymmetric pressure conditions which are then established may then bend one or more muffler elements to one side, until, when a specific bending angle is exceeded, the muffler element abruptly swings back and the flow conditions are thereby violently changed ("flip flop effect").

Such excitations of the muffler elements themselves are undesirable, since they may be transmitted to the surrounding flow duct and to further components in the surroundings and, for example, may lead to damage.

With regard to the muffler rows arranged "in line", the same effects may occur, but usually beyond higher flow velocities, as compared with the first instance. Although "in line" arrangements have a higher lower limit for the flow velocity beyond which the abovementioned undesirable effects occur, they are nevertheless inferior, in terms of their muffling properties, to the muffler rows arranged so as to be offset transversely, since, in an "in line" arrangement, a direct rectilinear sound path through the muffler rows is possible.

SUMMARY OF THE INVENTION

An object on which an embodiment of the present invention is based is to specify an improved muffler arrangement for a flow duct, in particular for an intake housing of a gas turbine.

At the same time, in particular, the undesirable excitation to vibration of the muffler elements is to be avoided as effectively as possible.

An object is achieved, according to the present invention, by way of a muffler arrangement for a flow duct, including at least two muffler rows which are arranged one behind the other in the direction of flow and in each case transversely to the direction of flow and which are formed by a number of muffler elements, the muffler elements of each muffler row being arranged in each case approximately equidistantly longitudinally in relation to the direction of flow, and the distance between the muffler rows corresponding approximately to at least four times, in particular at least six times, the distance between two muffler elements of a muffler row.

The distance defined according to an embodiment of the present invention between the muffler rows is selected, for most operating situations, so as to be sufficiently large to prevent the shedding of flow vortices at a first muffler row in the next row from leading to the abovementioned vibration problems. The distance defined according to an embodiment of the present invention functions in this case as a stabilizing zone for the flow between the muffler rows.

A further solution according to an embodiment of the present invention provides a muffler arrangement for a flow duct, including at least two muffler rows which are arranged one behind the other in the direction of flow and in each case transversely to the direction of flow and are formed by a number of muffler elements, the muffler elements of each muffler row being arranged in each case longitudinally in relation to the direction of flow, and the flow off edges of the muffler elements of at least one muffler row having guide plates.

The guide plates may in this case be designed, for example, as separate components and be connected to the respective flow off edges or may be produced materially integrally with the respective muffler elements as part of the muffler elements.

In this embodiment of the present invention, the guide plates serve for deflecting the flow flowing along the muffler elements into an intended direction of flow or for maintaining the existing intended direction of flow. Thus, minor disturbances in the flow cannot result in the flow being apportioned unevenly to the corridors between the muffler elements of the adjacent muffler row and oscillating between the corridors.

The term "guide plates" is, of course, also to embrace those elements suitable for flow guidance which are not manufactured from plate metal, but, for example, from plastic or other suitable materials. The material selection for the guide plates is best carried out with a view to a currently existing flow medium, so that the guide plates exposed to the flow medium withstand an attack by the flow medium (for example, abrasion or corrosion) as well as possible and have as high a fatigue strength as possible.

The guide plates impose essentially an unequivocal flow guidance, so that an excitation to vibration of the muffler elements is avoided as far as possible.

In a further embodiment of the present invention, the muffler elements of a muffler row are arranged in a row, as seen in the direction of flow, with respect to the muffler elements of at least one adjacent muffler row.

In this so called "in line" arrangement, the flow leaving a muffler row flows into the adjacent muffler row in a desired direction of flow.

In comparison with an arrangement in which adjacent muffler rows are arranged so as to be offset to one another, in this embodiment the lower limit velocity beyond which vibrations of the muffler elements are established as a result of a disturbance is increased.

In another embodiment of the present invention, the muffler elements of a muffler row are arranged so as to be offset transversely to the direction of flow, as seen in the direction of flow, with respect to the muffler elements of at least one adjacent muffler row.

In this embodiment, the splitting of one part flow, which leaves a corridor between two muffler elements of a muffler row and enters the adjacent muffler row, into two part flows is desired.

The muffler rows of this embodiment which are arranged so as to be offset make it possible, in particular, to have accurate flow guidance, so that an undesirable generation of vibration caused by an excitation of the muffler elements is avoided.

Preferably, the flow off edges of the plurality of muffler elements, in particular all the muffler elements, have guide plates, with the exception of the flow off edges of those muffler elements by means of which the last muffler row in the direction of flow is formed.

It is also possible for only some of the muffler elements to be provided at their respective flow off edges with a guide plate in each case, with the exception of the flow off edges of those muffler elements by way of which the last muffler row in the direction of flow is formed.

Since the last muffler row is not followed by any further muffler row, the flow no longer has to be oriented any further downstream of this last muffler row.

Preferably, at least some of the muffler elements have reinforcing elements.

In some operating situations of the muffler arrangement, it may happen that the vibration of muffler elements which is caused by way of the flow lies in the region of the characteristic frequency of these muffler elements. In this case, a displacement of the characteristic frequency of the muffler elements is implemented by way of the reinforcing elements, so that the covibration of the muffler elements is reduced.

In all the abovementioned embodiments in which guide plates are used, these are preferably dimensioned such that their respective length is at least as large as the thickness of the respective muffler elements.

The length may also be determined, for example, from the distance between two adjacent muffler elements of a muffler row and/or from the distance between two adjacent muffler rows; test series can contribute to recording the abovementioned dimensioning of the length in tabular form.

Various embodiments of the present invention are illustrated in more detail below.

Further scope of applicability of the present invention will become apparent from the detailed description given hereinafter. However, it should be understood that the detailed description and specific examples, while indicating exemplary embodiments of the present invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 illustrates a horizontal longitudinal section through a muffler arrangement according to an embodiment of the present invention, with a distance between the muffler rows;

FIG. 2 illustrates a horizontal longitudinal section through a further muffler arrangement according to an embodiment of the present invention with guide plates; and FIG. 3 illustrates a horizontal longitudinal section through a further muffler arrangement according to an embodiment of the present invention.

DETAILED DESCRIPTION OF THE EXEMPLARY EMBODIMENTS

FIG. 1 illustrates diagramatically a horizontal longitudinal section through a muffler arrangement according to the present invention, in this embodiment an object according to the invention being achieved by way of a distance 13 between two adjacent muffler rows 7 in relation to a distance 11 between two muffler elements of a muffler row 7.

A flow medium enters a flow duct 3 in a direction of flow 5.

In the present exemplary embodiment, within the flow duct 3 are arranged two muffler rows 7 which are arranged in each case transversely to the direction of flow 5, the muffler elements 9 which form the muffler rows 7 being arranged in each case longitudinally in relation to the direction of flow 5 in each muffler row 7.

According to the present invention, the distance 13 between the two muffler rows 7 amounts to at least approximately four times, in particular at least six times, the distance 11 between two adjacent muffler elements 9 of a muffler row 7.

The muffler elements 9 are arranged in each case approximately equidistantly in the muffler rows 7.

If, then, a flow medium passes through the first of the two muffler rows 7 in the direction of flow 5, the flow medium is in this case apportioned by way of the muffler elements 9 into directed part flows which in each case flow through the corridors formed in each case by two adjacent muffler elements 9 and emerge from these corridors. In the case of an undisturbed or only slightly disturbed flow of the flow medium, the part flows have in each case a direction of flow which is essentially identical to the direction of flow 5. If, then, it is assumed that, particularly at higher flow velocities, the flow medium has disturbances particularly with regard to the desired direction of flow 5, then the part flows which emerge from the first muffler row have part directions of flow which differ to a greater or lesser extent from the desired direction of flow 5 and may possibly oscillate between the corridors.

So that disturbances of this kind do not lead, in the next muffler row following in the direction of flow 5, to the abovementioned problems and consequently to undesirable excitations to vibration of the muffler elements, the distance 13 according to the invention implements a stabilizing zone, along which the part flows leaving the first muffler row can break down their disturbances, in particular swirlings, before they enter the following muffler row.

Thus, the embodiment of the present invention ensures that the flow passes uniformly through the corridors between in each case two adjacent muffler elements 9, in particular the second muffler row in the direction of flow 5.

FIG. 2 illustrates a horizontal longitudinal section through a further muffler arrangement 15 according to the present invention, flow off edges 24 of muffler elements 23 being provided with guide plates 25 in order to achieve an object according to the present invention.

In the embodiment of FIG. 2, a flow medium enters a flow duct 17 in the direction of flow 19.

In this embodiment, three muffler rows 21, through which the flow medium flows, are arranged one behind the other within the flow duct 17 in the direction of flow 19.

In contrast to the embodiment of FIG. 1, in this case the muffler rows 21 are arranged so as to be offset to one another ("staggered"), so that a part flow 30 which leaves one of the first two muffler rows 21 is apportioned in the following muffler row to those two flow corridors which are adjacent to the flow corridor out of which the part flow 30 emerges from the preceding muffler row 21.

In order to achieve as uniform and stationary apportionment as possible of the part flows 30 leaving a preceding muffler row 21 in each case to the two adjacent flow corridors between two muffler elements 23 of the following muffler row 21, the muffler elements 23 are provided at their respective flow off edges 24 with guide plates 25 which preferably have a length which is at least as large as the thickness of the muffler elements 23 and which, furthermore, preferably closes the gap between two muffler rows 21.

By way of the guide plates 25, the part flows 30 are oriented in such a way that the distribution of the part flows 30 in the following muffler row 21 is as stationary and uniform as possible and undesirable excitations to vibration of the muffler elements are avoided.

The last muffler row 21 in the direction of flow 19 preferably has no guide plates 25, since the flow medium which leaves this last muffler row 21 cannot excite any further muffler row and therefore does not have to be oriented any further in order to avoid excitations to vibration.

Those guide plates of the number of guide plates 25 which are illustrated by broken lines in FIG. 2 can, but do not, however, have to be present. These are, in particular, guide plates of muffler elements 23 for which two adjacent muffler elements of the following muffler row do not exist.

FIG. 3 illustrates a further muffler arrangement 47 according to the present invention, only individual muffler elements 32 of muffler rows 43 being illustrated for the sake of greater clarity.

A flow medium flows into a flow duct 45 in the direction of flow 35.

In this embodiment, the muffler rows 43 are arranged so as to be offset to one another, so that a flow led between two muffler elements 32 of one of the muffler rows 43 is apportioned into two part flows in the next muffler row.

According to the present invention, the flow off edges 39 of the muffler elements 32 of at least one muffler row 43 have guide plates 37. In the present exemplary embodiment, these guide plates 37 are materially integral with the muffler elements 32 and are formed, for example, by way of a tapering shaping of the flow off edges 39 of the muffler elements 32. An angle a which is formed by the legs of the flow off edge 39 is in this case preferably an acute angle with an angle value of at most 90°.

In the present exemplary embodiment, the onflow edges 41 of the second muffler row following a first muffler row in the direction of flow 35 also have guide plates 37.

These guide plates arranged at the onflow edges 41 serve mainly the purpose of producing a defined part corridor width 52 between a muffler element 32 of a preceding muffler row 43 and a muffler element 32 of a muffler row following in the direction of flow 35.

The part corridor width 52 is in this case preferably half as large as a corridor width 50 between two adjacent muffler elements 32 of the preceding muffler row.

In this way, a flow led between two muffler elements 32 of a muffler row is apportioned, without any loss of flow velocity, to the two part corridors in the following muffler row 43 which are dimensioned by way of the part corridor width 52.

Since a loss of flow velocity is avoided, the undesirable formation of flow vortices is also avoided as far as possible.

The corridor width 50 and the part corridor width 52 are consequently advantageously dimensioned such that the flow cross sectional area corresponding to the corridor width 50 corresponds to the sum of the two part flow cross sectional areas corresponding to the part corridor widths 52.

Preferably, therefore, the flow off edges 24 of the muffler elements 23 of at least one muffler row 21 have in each case guide plates 25, while the respective guide plate 25 at the flow off edges of individual muffler elements 23 may be dispensed with, particularly when two adjacent muffler elements 23 do not exist for the respective muffler element 23 in the following muffler row 21.

The present invention can be illustrated in summary as follows:

In a muffler arrangement 1, 15 according to an embodiment of the present invention, muffler elements 9, 23 are arranged in rows which are oriented in each case transversely to the direction of flow 5, 19; the muffler elements 9, 23 themselves are oriented in each case longitudinally in relation to the direction of flow 5, 19. The distance 13 between two adjacent muffler rows 7, 21 amounts in this case approximately to at least four times, in particular at least six times, the distance 11 between two adjacent muffler elements of the equidistantly arranged muffler elements 9, 23 of a muffler row 7, 21 and/or the flow off edges 24 of the muffler elements 9, 23 of at least one muffler row 7, 21 have guide plates 25, although, in this embodiment, an equipping of the muffler elements 9, 23 of the last muffler row 7, 21 in the direction of flow 5, 19 may be dispensed with.

What is claimed is:

1. A muffler arrangement for a flow duct, comprising:
at least two muffler rows being arranged one behind the other in a direction of flow, each of the at least two muffler rows being further arranged transversely to the direction of flow, and being formed by a number of muffler elements, the muffler elements of each muffler row being arranged longitudinally in relation to the direction of flow, and wherein at least a plurality of the muffler elements include a flow off edge and a guide plate.

2. The muffler arrangement as claimed in claim 1, wherein the flow off edges of the plurality of muffler elements have guide plates, with the exception of the flow off edges of muffler elements that from a last muffler row in the direction of flow.

3. The muffler arrangement as claimed in claim 1, wherein the muffler elements of a muffler row being arranged in a row, as seen in the direction of flow, with respect to the muffler elements of at least one adjacent muffler row.

4. The muffler arrangement as claimed in claim 1, wherein the muffler elements of a muffler row are arranged so as to be offset transversely with respect to the muffler elements of at least one adjacent muffler row.

5. The muffler arrangement as claimed in claim 1, wherein the plurality of guide plates have a length, which is greater than or equal to the thickness of the muffler elements.

6. The muffler arrangement as claimed in claim 1, wherein the guide plates close a gap between at least two muffler rows.

7. The muffler arrangement as claimed in claim 1, wherein one of two adjacent muffler elements includes a guide plate.

8. The muffler arrangement as claimed in claim 1, wherein the guide plates are materially integral with the muffler elements.

9. The muffler arrangement as claimed in claim 1, wherein legs of each of the flow off edges form an angle, which is less than or equal to 90 degrees.

10. The muffler arrangement as claimed in claim 1, wherein the at least two muffler rows include a first muffler row and a second muffler row, and the second muffler row includes onflow edges and guide plates.

11. The muffler arrangement as claimed in claim 1, further including a part corridor width, which is equal to half of a corridor width.

12. The muffler arrangement as claimed in claim 1, further including a corridor width and a part corridor width, wherein the corridor width includes two part corridor widths, and the corridor width is equal to a sum of cross-sectional areas of the two part corridor widths.

* * * * *